United States Patent [19]
Kohlbacher

[11] Patent Number: 5,813,218
[45] Date of Patent: Sep. 29, 1998

[54] THRUST REVERSER DOOR LOCK VENT AND METHOD

[75] Inventor: Leo Kohlbacher, Northridge, Calif.

[73] Assignee: Rooke Corp., North Hollywood, Calif.

[21] Appl. No.: 756,764

[22] Filed: Nov. 26, 1996

[51] Int. Cl.$^6$ ............................................. F02K 1/54
[52] U.S. Cl. ........................ 60/204; 60/39.091; 60/226.2
[58] Field of Search ........................... 60/39.091, 204, 60/223, 226.2, 230; 90/5 L; 244/110 B

[56] References Cited

U.S. PATENT DOCUMENTS

| | | | |
|---|---|---|---|
| 4,424,669 | 1/1984 | Fage | 60/230 |
| 4,437,783 | 3/1984 | Halin et al. | 60/226.2 |
| 4,754,694 | 7/1988 | Martin | 92/5 L |
| 4,761,949 | 8/1988 | Leclercq | 60/226.2 |
| 4,827,248 | 5/1989 | Crudden et al. | 60/230 |

*Primary Examiner*—Louis J. Casaregola
*Attorney, Agent, or Firm*—Blakely, Sokoloff, Taylor & Zafman LLP

[57] ABSTRACT

Method and apparatus for reducing thrust reverser lock switch malfunctions by ducting slipstream air into the compartment containing the thrust reverser door hydraulic lock assembles and lock switches. The slipstream air is ducted into this chamber by ducts mounted on the outer wall of the thrust reverser itself just forward of the locks and the lock switches, the air being ducted in opposition to any tendency of the engine exhaust to flow into this region during operation of the thrust reverser. The installation of the scoops to purge the latch switch areas with outside air has been reported during testing to solve the switch fouling problems, and has been shown to be an effective solution to the problem. The ram air introduced into the latch switch area pressurizes that area and prevents the flow of contaminated air over the latch switches.

10 Claims, 2 Drawing Sheets

THRUST REVERSER DOOR LOCK VENT AND METHOD

BACKGROUND OF THE INVENTION

1. Field of the Invention

The present invention relates to the field of thrust reversers for jet engines, and more particularly to thrust reverser door locks and lock indicator switches therefor.

2. Prior Art

The preferred embodiment of the present invention is specifically intended for installation and operation in conjunction with thrust reversers on the engines of DC-9 type aircraft, and more particularly such thrust reversers as use hydraulic thrust reverser door locks for locking the thrust reverser doors in the retracted position, as opposed to mechanical door locks used on some DC-9 type aircraft. In that regard, the mechanical thrust reverser door locks used on some DC-9 aircraft use an over-center type mechanism which causes substantial deflection of the thrust reverser door arms on each operation thereof. This results in a reasonably frequent replacement requirement to avoid fatigue failures of the reasonably expensive arms.

In the case of the hydraulic thrust reverser door locks, there is no such fatigue problem. However, each hydraulic lock assembly includes a switch to provide an indication to the pilot that the thrust reverser doors are, in fact, locked in the retracted position. The nature and position of these switches in the assembly is such that the thrust reverser doors, when in the extended position, cause part of the exhaust stream to be deflected back into the region of the lock assembles and switches. This results in the accumulation of soot, unburned fuel and the like on the switches, leading to early and erratic malfunction thereof. Such failures are, in themselves, very expensive from an operational standpoint, as it is essential to know that the thrust reverser doors are locked in the retracted position before takeoff. Thus, a switch failure before flight will hold up the flight until the problem is resolved.

SUMMARY OF THE INVENTION

A method and apparatus for reducing thrust reverser lock switch malfunctions by ducting slipstream air into the compartment containing the thrust reverser door hydraulic lock assembles and lock switches is disclosed. In accordance with the method, slipstream air is ducted into this chamber by ducts mounted on the outer wall of the thrust reverser itself just forward of the locks and the lock switches, the air being ducted in opposition to any tendency of the engine exhaust to flow into this region during operation of the thrust reverser. The installation of the scoops to purge the latch switch areas with outside air have been reported during testing to solve the switch fouling problems, and has been shown to be an effective solution to the problem. The ram air introduced into the latch switch area pressurizes that area and prevents the flow of contaminated air over the latch switches.

BRIEF DESCRIPTION OF THE FIGURES

FIG. 7 is a perspective view of the duct of the present invention schematically illustrating the flow of air there through.

DETAILED DESCRIPTION OF THE PRESENT INVENTION

Figure 3:
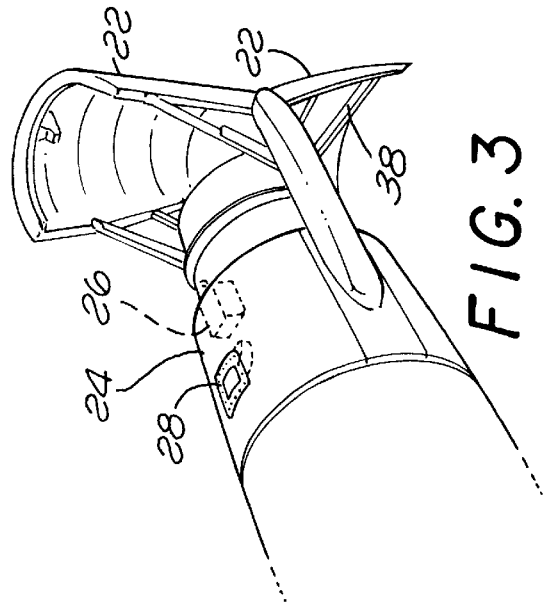
FIG. 3 is a view similar to that of FIG. 2, but with the thrust reverser doors extended.
Figure 2:
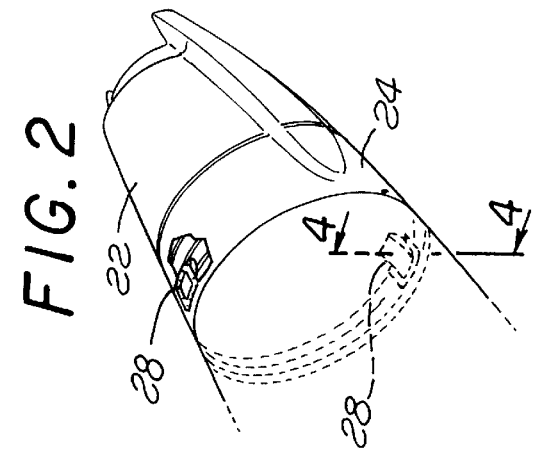
FIG. 2 is a view taken on an enlarged scale along line 2—2 of FIG. 1, showing the aft portion of one of the engines of the aircraft of FIG. 1 with the thrust reverser doors retracted or closed.
Figure 1:
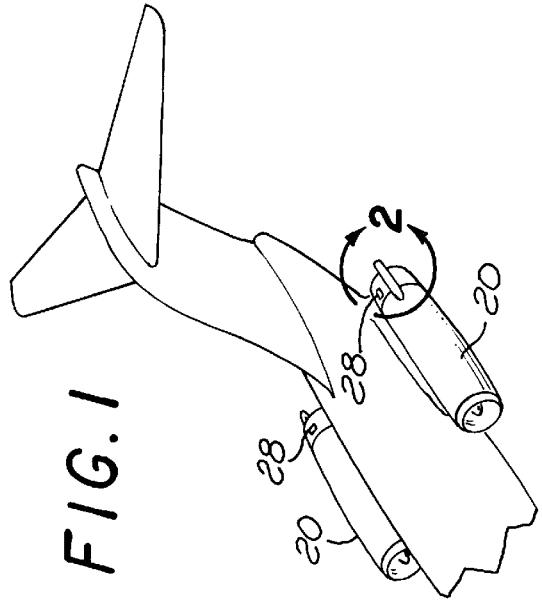
FIG. 1 is a perspective view of the aft portion of a DC-9 aircraft incorporating the present invention.

First referring to FIG. 1, a perspective view of the aft portion of a DC-9 aircraft may be seen. The aircraft is powered by a pair of jet engines 20 disposed at each side of the aft section of the aircraft and supported from the fuselage structure. The aft portions of the engines themselves, as may be seen in FIGS. 2 and 3, include thrust reverser doors 22 which, in the retracted position as shown in FIG. 2, form a streamlined continuation of the engine nacelle 24. When extended, however, as shown in FIG. 3, the thrust reverser doors 22 extend to block the engine exhaust, and to deflect the same upward and downward with a substantial forward component so as to reverse the direction of the net thrust of the engine. When so deflected, in the prior art this reverse exhaust flow will cause some exhaust gasses to enter a compartment or region 26 (see FIG. 3). In certain engines using hydraulic actuators for the thrust reverser door locks, a thrust reverser door lock switch is located in this compartment to provide a cockpit warning signal in the event that the respective thrust reverser door is not locked in the retracted position. This reverse flow into the area of the thrust reverser door lock switches results in the accumulation of soot and other foreign matter on the switches, leading to a premature malfunction of the switches.

In accordance with the present invention, a small duct 28 (see FIGS. 1 through 3) is provided in the outer wall of the thrust reverser itself, just forward of the region 26 containing the upper thrust reverser door lock and lock switch. There is also provided, of course, an identical duct 28 on the lower side of the engine at the same location (see FIG. 2) just forward of the lower thrust reverser door lock and lock switch assemblies.

Figure 4:
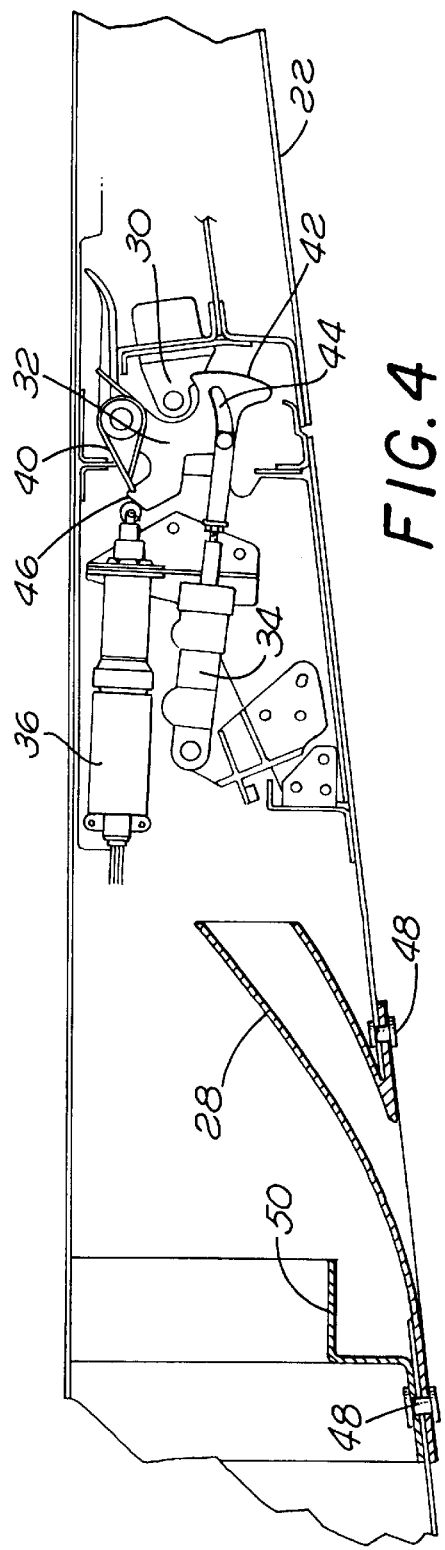
FIG. 4 is a local cross section of the thrust reverser door lock region taken along line 4—4 of FIG. 2.

Now referring to FIG. 4, a cross-sectional view taken along line 4—4 of FIG. 2 may be seen. The lower thrust reverser door 22 includes a latch roller assembly 30 attached thereto. The engine nacelle just forward of the thrust reverser door includes a pivoting hook 32 driven by hydraulic actuator 34, with the thrust reverser door lock switch 36 sensing the position of the hook 32. In operation, the actuator 34 will be actuated (retracted) to release the hook 32 from the hook pin 30 to allow the thrust reverser door 22 to swing open on arms 38 (see FIG. 3) to the extended position. Once released, the actuator 34 will return to the position shown with spring 40 encouraging the hook 32 back to the position shown. Now when the thrust reverser doors are again retracted, the latch roller assembly 30 will first contact cam surface 42 of the hook 32, deflecting the same against the force of spring 40 to allow the door to move to the fully closed position, wherein the latch roller 30 is hooked by the hook 32 to lock the door in the closed position. The deflection of the hook 32 is allowed by the actuator 34 because of the slot 44 in the hook, allowing the hook to move the required distance without requiring a corresponding actuator motion.

In the event the lock roller 30 is not properly hooked by the hook 32, such as might be caused by a damaged thrust reverser door, door support arm, or other malfunction, the hook 32 will remain in a deflected position with the cam surface 46 on the hook positioning the switch to indicate that the door is not locked in the retracted position.

Referring again to FIG. 4, a fore and aft cross-section of the duct 28 of the present invention may be seen. As shown therein, an opening has been cut in the outer thrust reverser wall skin, with duct 28 being riveted in position through the opening by rivets 48, the forwardmost rivets also holding the skin to reinforcing member 50. For installation, these rivets are drilled out and replaced when the duct is in position.

Figure 5:
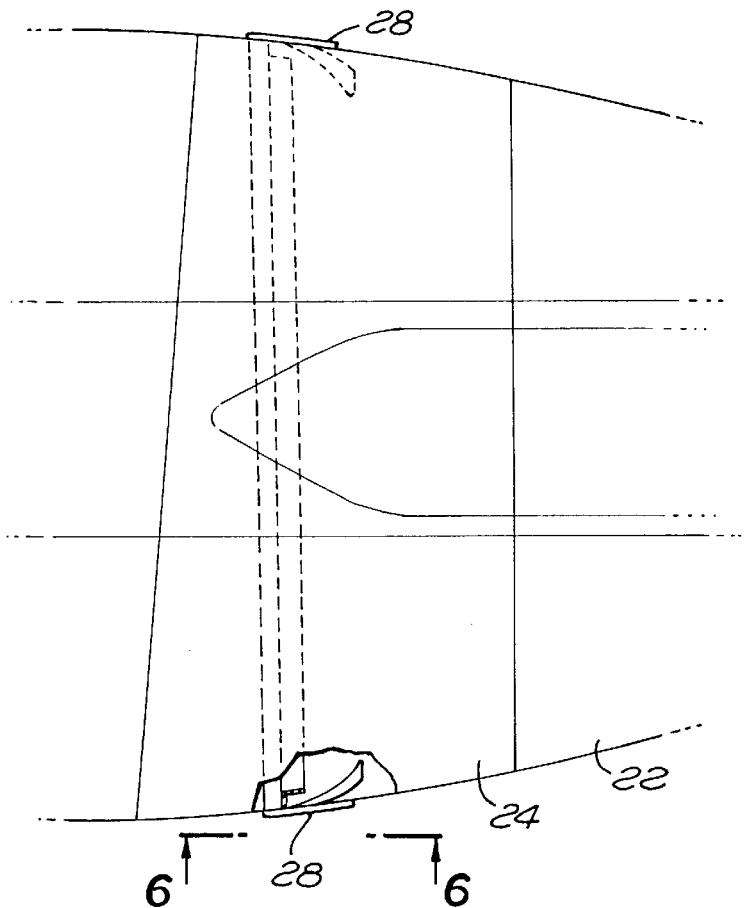
FIG. 5 is a side view of part of an engine nacelle, partially cut away to show the disposition of the duct of the present invention.
Figure 6:
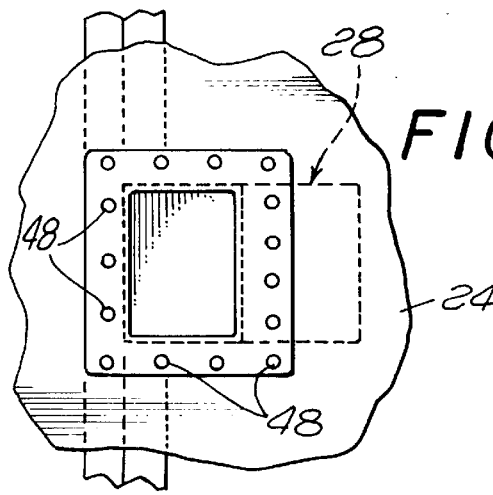
FIG. 6 is a view taken along line 6—6 of FIG. 5.
Figure 7:
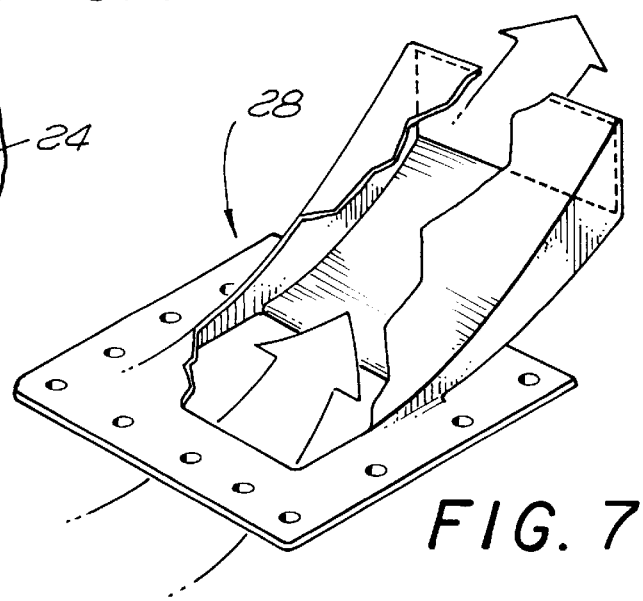

The general positioning of the duct may also be seen in FIG. 5, with a face view and a prospective view thereof being shown in FIGS. 6 and 7. The duct is mounted substantially flush with the outer surface of the thrust reverser. It is positioned forward of each thrust reverser door lock switch, and is of sufficient extent to duct relatively high energy slipstream air into the compartment containing the respective thrust reverser door lock switch so as to counteract the tendency of the engine exhaust to come into this region when the thrust reverser doors are extended. In this way, the thrust reverser door lock switches are protected against contamination by the engine exhaust so that the tendency for erratic operation and premature failure of the switches from this cause are substantially eliminated. This results in substantial savings to the operators of the aircraft, as a faulty thrust reverser door lock switch is a basis for delay of a flight until repaired, and is a source of unnecessary concern if the malfunction occurs once the aircraft is in the air.

While a preferred embodiment of present invention has been described in detail herein, it will be understood by those skilled in the art that various changes in form and detail may be made therein without departing from the spirit and scope of the invention.

What is claimed is:

1. Apparatus for reducing faulty operation of thrust reverser lock switches comprising a duct extending through the outer skin of a thrust reverser and mounted so as to duct high energy slipstream air into the compartment containing a thrust reverser lock switch.

2. The apparatus of claim 1 wherein the duct is mounted substantially flush with the outer surface of the engine nacelle.

3. The apparatus of claim 1 wherein the duct is mounted forward of the thrust reverser lock switch.

4. The apparatus of claim 3 wherein the duct directs high energy slipstream air in an aft direction over the thrust reverser lock switch.

5. Apparatus for reducing faulty operation of thrust reverser lock switches comprising a duct mounted on, substantially flush with and extending through the outer skin of an engine nacelle forward of the thrust reverser lock switch so as to duct slipstream air in an aft direction into the compartment containing a thrust reverser lock switch and over the thrust reverser lock switch, the ducted slipstream air having a sufficiently high energy to substantially prevent engine exhaust from flowing back over the thrust reverser lock switch when the thrust reverser doors are open.

6. A method of reducing faulty operation of thrust reverser lock switches comprising:

disposing a duct through the outer skin of an engine nacelle so as to be in communication with the compartment containing a thrust reverser lock switch; and, ducting through the duct, slipstream air having a sufficiently high energy to counteract the tendency of engine exhaust gas to flow back into the compartment and over the thrust reverser lock switch when the thrust reverser doors are extended.

7. The method of claim 6 wherein the step of disposing a duct through the outer skin of an engine nacelle comprises the step of mounting the duct so as to be substantially flush with the outer surface of the engine nacelle.

8. The method of claim 6 wherein the step of disposing a duct through the outer skin of an engine nacelle comprises the step of mounting the duct forward of the thrust reverser lock switch.

9. The method of claim 8 wherein the duct is mounted to direct high energy slipstream air in an aft direction over the thrust reverser lock switch.

10. A method for reducing faulty operation of thrust reverser lock switches comprising mounting a duct on, substantially flush with and extending through the outer skin of the engine nacelle forward of the thrust reverser lock switch so as to duct slipstream air in an aft direction into the compartment containing a thrust reverser lock switch and over the thrust reverser lock switch, the ducted slipstream air having a sufficiently high energy to substantially prevent engine exhaust from flowing back over the thrust reverser lock switch when the thrust reverser doors are open.

\* \* \* \* \*